United States Patent
Morrison

(10) Patent No.: US 9,252,952 B2
(45) Date of Patent: Feb. 2, 2016

(54) GESTURE-BASED ENCRYPTION METHODS AND SYSTEMS

(71) Applicant: Lockheed Martin Corporation, Bethesda, MD (US)

(72) Inventor: John Stuart Morrison, Crownsville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/133,114

(22) Filed: Dec. 18, 2013

(65) Prior Publication Data

US 2014/0181523 A1 Jun. 26, 2014

Related U.S. Application Data

(60) Provisional application No. 61/740,045, filed on Dec. 20, 2012.

(51) Int. Cl.
*H04L 9/00* (2006.01)
*H04L 9/08* (2006.01)
*H04L 9/32* (2006.01)
*G06F 21/32* (2013.01)
*H04L 29/06* (2006.01)

(52) U.S. Cl.
CPC ............. *H04L 9/0861* (2013.01); *G06F 21/32* (2013.01); *H04L 9/3231* (2013.01); *H04L 63/06* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 7,173,604 B2 | 2/2007 | Marvit et al. | |
| 7,180,501 B2 | 2/2007 | Marvit et al. | |
| 7,991,896 B2 | 8/2011 | Shen et al. | |
| 8,046,721 B2 | 10/2011 | Chaudhri et al. | |
| 2007/0271466 A1 | 11/2007 | Mak et al. | |
| 2009/0165121 A1 | 6/2009 | Kumar | |
| 2009/0178011 A1 | 7/2009 | Ording et al. | |
| 2009/0227232 A1 | 9/2009 | Matas et al. | |
| 2010/0052851 A1 | 3/2010 | Kaehler | |
| 2010/0113140 A1 | 5/2010 | Kelly et al. | |
| 2011/0154444 A1 | 6/2011 | Sriraghavan et al. | |
| 2011/0260829 A1 | 10/2011 | Lee | |
| 2011/0282785 A1* | 11/2011 | Chin | 705/42 |
| 2011/0296356 A1 | 12/2011 | Chaudhri et al. | |
| 2011/0296508 A1 | 12/2011 | Os et al. | |
| 2012/0274550 A1* | 11/2012 | Campbell et al. | 345/156 |
| 2013/0159732 A1* | 6/2013 | Leoutsarakos | 713/193 |

OTHER PUBLICATIONS

Wu et al., "Research on Gesture Cryptographic Platform Based on Trusted Computing," 2010 International conference on Optics, photonics and energy engineering, OPEE 2010, pp. 254-257.

* cited by examiner

*Primary Examiner* — Ghazal Shehni
(74) *Attorney, Agent, or Firm* — Oblon, McClelland, Maier & Neustadt, L.L.P.

(57) ABSTRACT

Methods and systems for transmitting and receiving are disclosed. For example, a method for establishing secure communications can include measuring one or more human gestures using a sensor on a first device so as to create a first metric of the one or more human gestures, creating a strong encryption key based on the first metric, including time-based information incorporated into the first metric, and communicating to a second device using the strong encryption key to encrypt data sent to the second device.

17 Claims, 8 Drawing Sheets

GESTURE-BASED ENCRYPTION METHODS AND SYSTEMS

INCORPORATION BY REFERENCE

This application claims the benefit of U.S. Provisional Application No. 61/740,045 entitled "Gesture-Based Encryption on Touch-Screen Devices" filed on Dec. 20, 2012, the content of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Computers and processor-based systems, such as smart phones and tablets, often have a need for secure communications. Unfortunately, while there are numerous available encryption/decryption schemes available, most lack the inherent encryption strengths necessary to provide true security.

SUMMARY

Various aspects and embodiments of the invention are described in further detail below.

In an embodiment, a method for establishing secure communications includes measuring one or more human gestures on a first device so as to create a first metric of the one or more human gestures, creating a strong encryption key based on the first metric, and communicating to a second device using the strong encryption key to encrypt data sent to the second device.

In another embodiment, a device for establishing secure communications, includes a sensor capable of time-based measurement of one or more human gestures, metric circuitry configured to create a first metric base on the one or more human gestures, initial key generation circuitry capable of producing an initial encryption key based on a portion of the first metric, strong key generation circuitry capable of producing a strong encryption key based on the first metric including time information of the first metric not used to create the initial encryption key, encryption circuitry configured to encode the strong encryption key using the initial encryption key to create an encoded strong encryption key, and input/output circuitry configured to send the encoded strong encryption key to a second device.

In yet another embodiment, a method for establishing secure communications includes time-based measuring of one or more human gestures, creating a first metric base on the one or more human gestures, producing an initial encryption key based on a portion of the first metric, producing a strong encryption key based on the first metric including time information of the first metric not used to create the initial encryption key, encoding the strong encryption key using the initial encryption key to create an encoded strong encryption key, and sending the encoded strong encryption key to a second device.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

Figure 1:
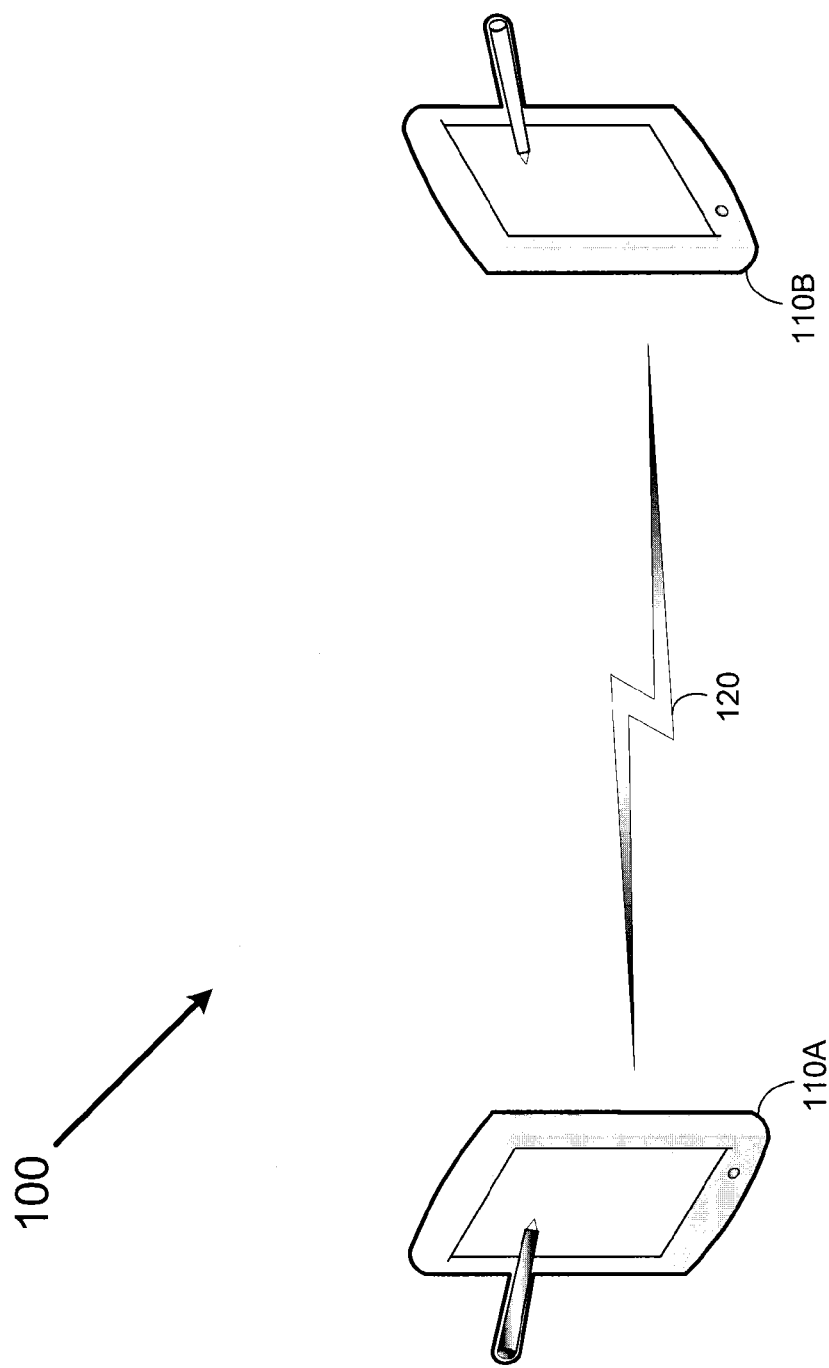
FIG. 1 depicts a system having two touch-screen devices coupled together to provide communications.

FIG. 1 depicts a communication system 100 usable to provide secure communications. As shown in FIG. 1, the communication system 100 includes a first communication device 110A coupled to a second communication device 110B via an electronic communications link 120. While the two communication devices {110A, 110B} depicted in FIG. 1 are tablet computers having wireless interfaces, it is to be appreciated that either of the two communication devices {110A, 110B} can take a large number of forms, including any of a large number of smart phones, tablets, laptop computers and other computers as long as such forms include an appropriate set of sensors, such as a touch screen or multi-dimensional position sensors, capable of sensing/measuring human gestures, and a timer for providing time-based references for such gestures.

Figure 2:
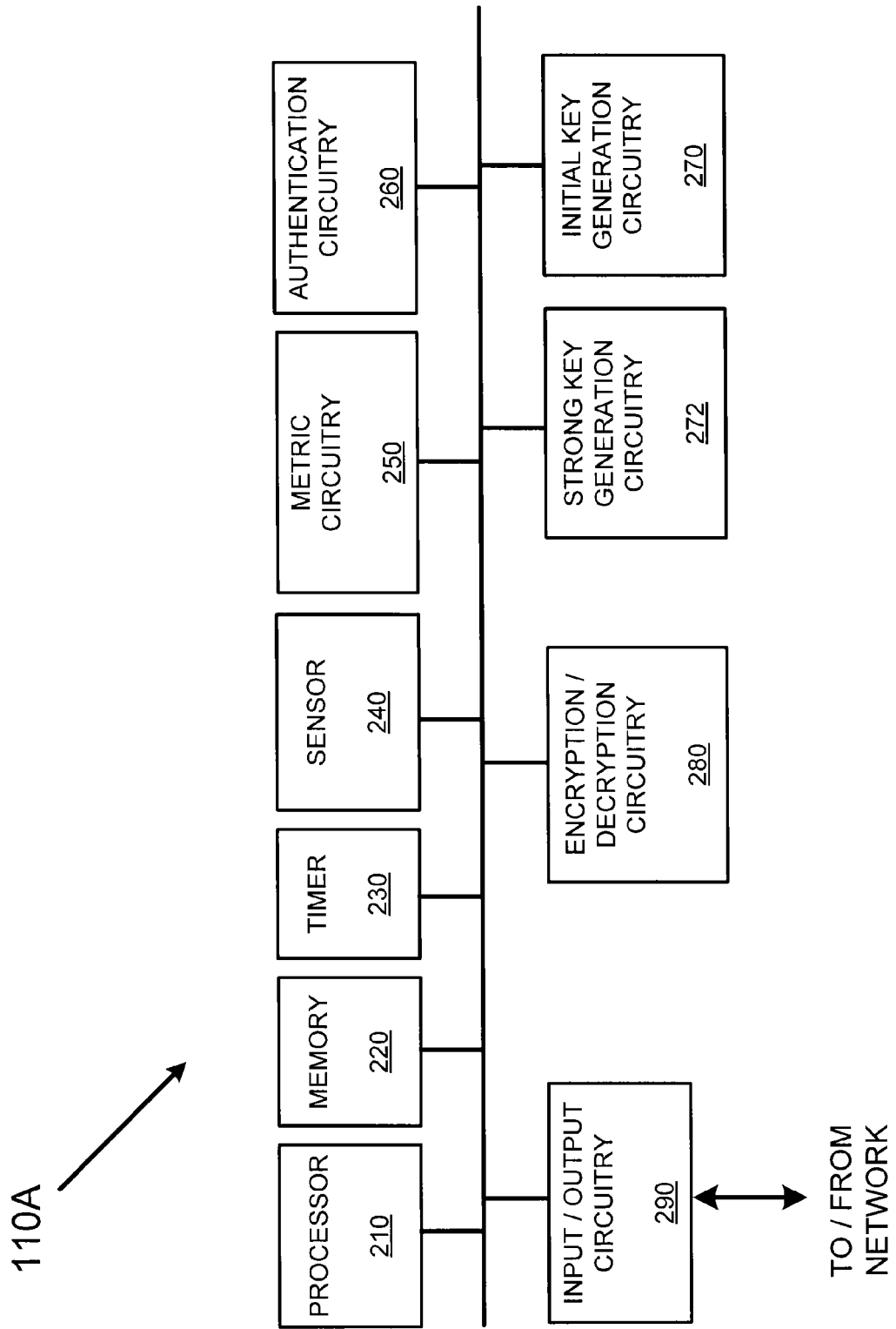
FIG. 2 is a block diagram of a processing system usable to provide secure communications.

FIG. 2 is a block diagram of the first communication device 110A usable to provide secure communications in the system 100 of FIG. 1. For purposes of explanation, only the first communication device 110A is described in detail with the second communication device 110B assumed to have an identical or similar structure. Hereinafter, the second communication device 110B is referred to as the "second/remote device."

As shown in FIG. 2, the first communication device 110A includes a processor 210, a memory 220, a timer 230, a sensor 240, metric circuitry 250, authentication circuitry 260, initial key generation circuitry 270, strong key generation circuitry 272, encryption/decryption circuitry 280 and input/output circuitry 290.

Although the first communication device 110A of FIG. 2 uses a bussed architecture, it should be appreciated that any other architecture may be used as is well known to those of ordinary skill in the art. For example, in various embodiments, the various components 210-290 can take the form of separate electronic components coupled together via a series of separate busses.

Still further, in other embodiments, one or more of the various components 210-290 can take form of separate processing systems coupled together via one or more networks. Additionally, it should be appreciated that each of components 210-290 advantageously can be realized using multiple computing devices employed in a cooperative fashion.

It also should be appreciated that some of the above-listed components 250-280 can take the form of software/firmware routines residing in memory 220 and be capable of being executed by the controller 210, or even software/firmware routines residing in separate memories in separate computing systems being executed by different controllers.

In operation and under control of the processor 210, the authentication circuitry 260 is used to authenticate an identity of a second/remote device and user, and to provide authentication information to enable the second/remote device and user to authenticate the user and identity of the first communication device 110A.

Figure 3A:
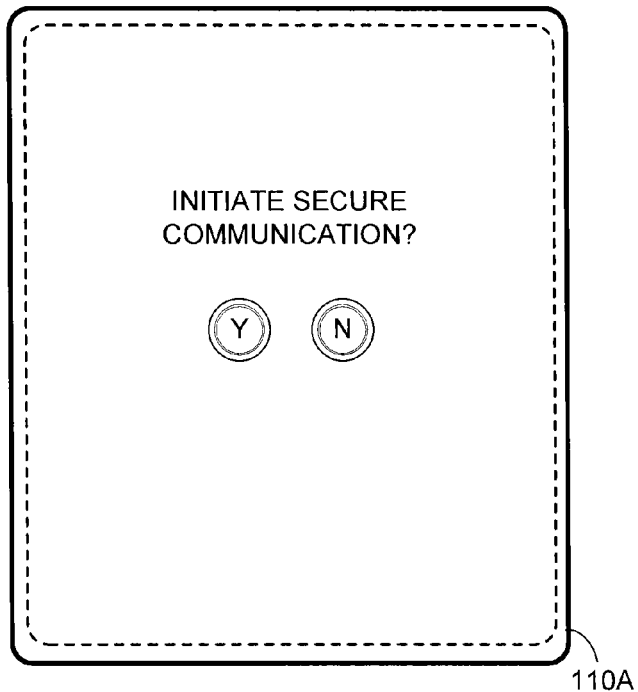
FIGS. 3A-3B depict respective screens for initiating secure communications.

FIG. 3A depicts an exemplary initiation screen whereby a user can initiate secure communication by selecting the "Y" button. Upon a "Y" selection, the authentication circuitry 260 samples a communication initiation time $T_I$ using the timer 230, then sends a communication request to the second device along with the communication initiation time $T_I$.

Figure 3B:
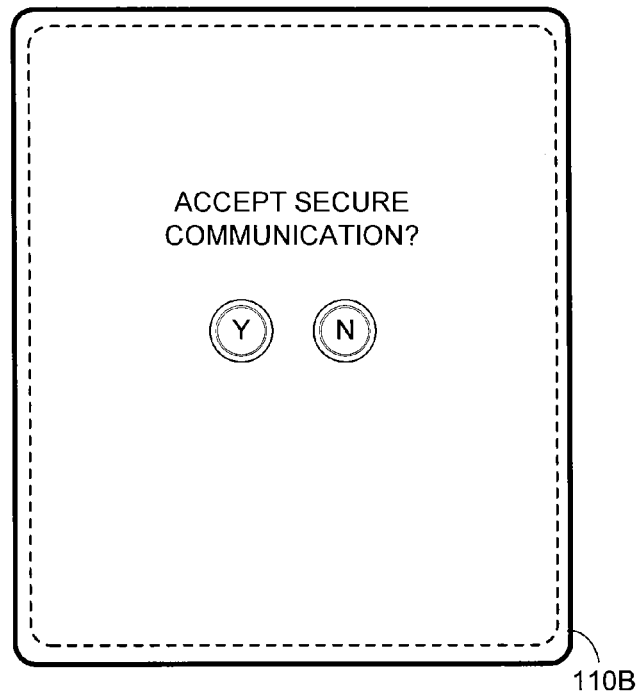

FIG. 3B depicts a complimentary acceptance screen whereby a user of the second device can accept an offer for secure communication by selecting the "Y" button. Assuming a "Y" selection by a user of the second device, the authentication circuitry 260 continues its authentication process and prompts the user to create a mark, i.e., a set of one or more gestures, using a touch screen (e.g., sensor 240) and timer 230.

Figure 4A:
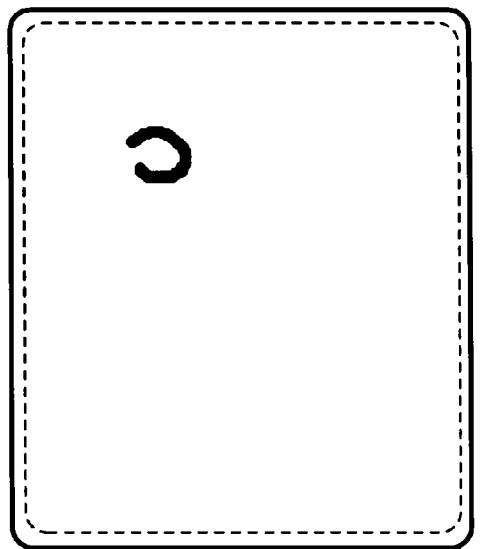
FIGS. 4A-4C depict a first exemplary gesture usable to establish secure communications.
Figure 4B:
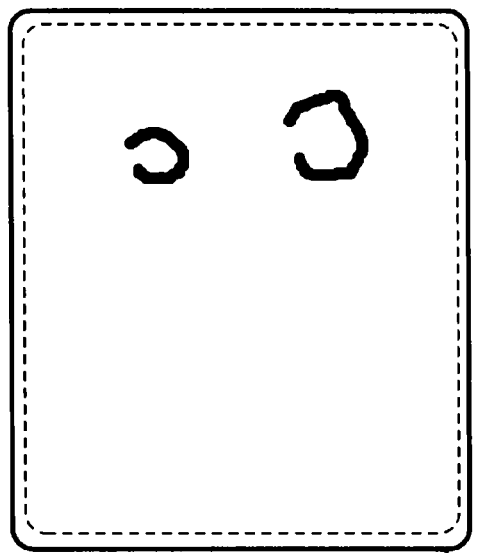
Figure 4C:
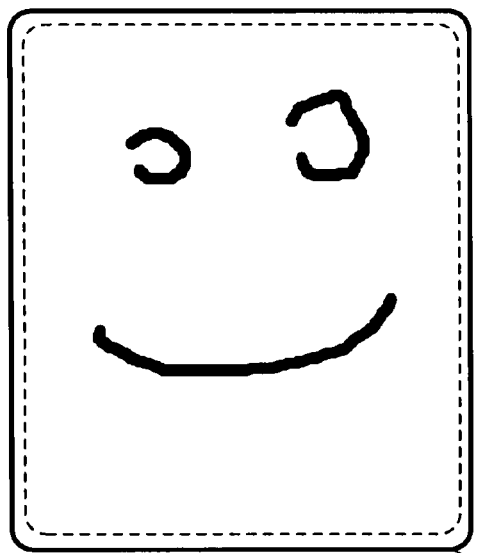

FIGS. 4A-4C depict a first exemplary set of gestures usable to establish secure communications. For reference, the first exemplary set of gestures is drawn using the sensor 240 of the first communication device 110A, while a second exemplary set of gestures (discussed below) is drawn using a sensor of the second/remote device.

As shown in FIGS. 4A-4C, a depiction of a face can be made using three separate simple gestures. The resulting metric $M_1$, i.e., the particular mathematical representation of the face, can take many forms. In the present example of FIGS. 4A-4C, the metric $M_1$ includes a list of locations, e.g., pixels, that are touched, along with the sequence each location was touched and the respective (absolute or relative) time that each location was touched. However, the form of metric $M_1$ can change from embodiment to embodiment to encompass any practical or realizable expression, such as one or more Taylor series, derivative information, e.g., rate of angular change and/or speed in which a gesture is made, centroids and statistical information of gestures, relative angles formed by various intersecting lines, and so on.

Because of the inherent uncertainty of human physical actions, there will be unpredictable variations in both which locations of a touch screen are touched, the exact sequence that locations are touched and the relative times that locations are touched. Accordingly, even should a user attempt to recreate the exact same picture in the exact same way, the likelihood that any set of gestures will be identical in any of billions of attempts is extremely remote. Thus, a truly random basis, as opposed to pseudo-random basis, for an encryption key can be created.

The desired metric $M_1$ for the gestures in FIGS. 4A-4C can be conveyed by the generalized expression:

$$M_1 = f_1(x,y,t,n) \quad \text{Eq. (1)}$$

where $\{x, y\}$ denote Cartesian coordinates, t denotes a time that a particular location was touched, and n denotes the sequence upon which locations were touched. The metric may also be transformed into other coordinate systems such as polar, spherical, or hyper-dimensional, and additional factors may be added, such as a z-component, pitch, roll, yaw, etc.

By ignoring the time variable, a more generalized, but incomplete, metric $M'_1$ for the gestures in FIGS. 4A-4C may be conveyed by the expression:

$$M'_1 = f_1(x,y,n) \quad \text{Eq. (2)}$$

By ignoring both time and sequence information, an even more generalized (and incomplete) metric $M''_1$ for the gestures in FIGS. 4A-4C may also be conveyed by the expression:

$$M''_1 = f_1(x,y) \quad \text{Eq. (3)}$$

Figure 5:
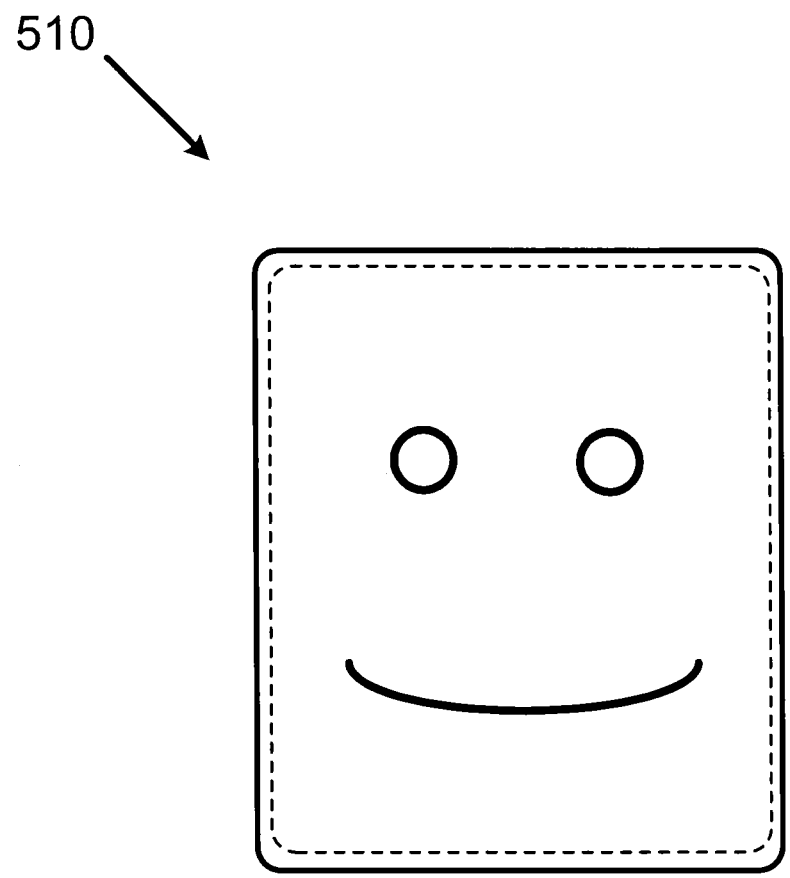
FIG. 5 depict a first reference image for the first gesture usable to establish secure communications.

FIG. 5 depicts a respective first reference image 510 for which a user strives to imitate with the gestures of FIGS. 4A-4C. The first reference image 510 can be stored as a metric $M'_{R1}$ taking into account a desired sequence according Eq. (4) below:

$$M'_{R1} = f_{R1}(x,y,n) \quad \text{Eq. (4)}$$

or be reduced to a simple set of x, y coordinates according Eq. (5) below:

$$M''_{R1} = f_{R1}(x,y) \quad \text{Eq. (5)}$$

The first reference image 510 should reside as a priori knowledge in any remote device for which secure communications is desired. Similarly, reference images for remote devices for which secure communication is desired should reside in the first communication device 110A.

Figure 6A:
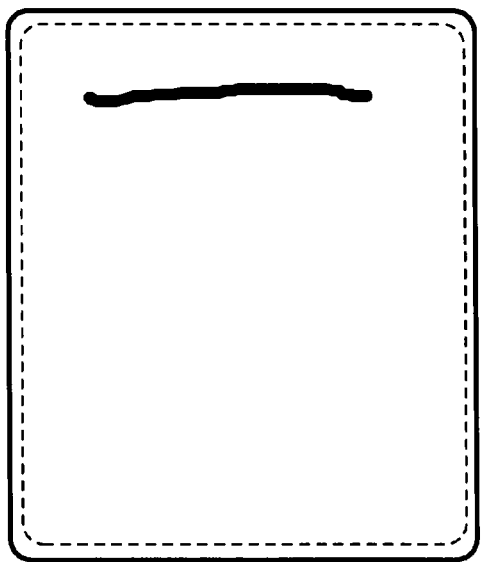
FIGS. 6A-6C depict a second exemplary gesture usable to establish secure communications.
Figure 6B:
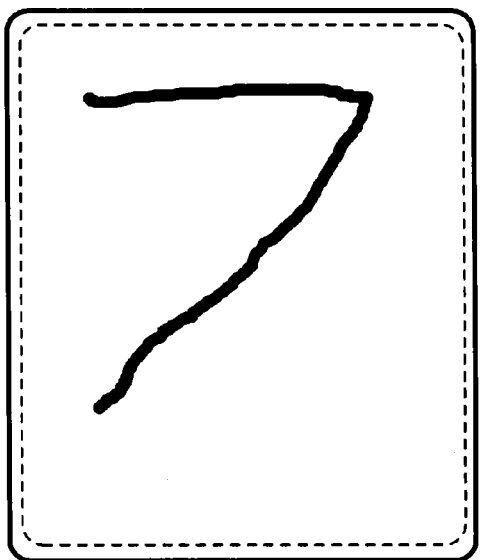
Figure 6C:
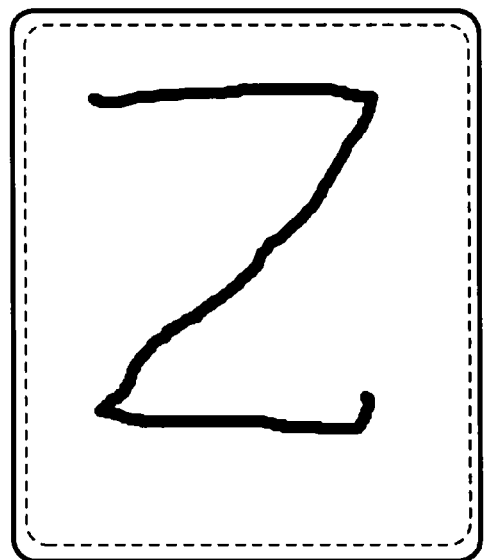

FIGS. 6A-6C depict a second exemplary set of gestures belonging to the second/remote device usable to establish secure communications with the first communication device 110A of FIG. 2. As shown in FIGS. 5A-5C, a simple "Z" shape is drawn over a timeframe using three separate gestures. As with the shape of FIGS. 4A-4C, the resultant metric $M_2$ of FIGS. 5A-5C can be expressed in one of many forms, such as a sequential list of pixels touched with respective times, a list of prominent features, and so on. The metric $M_2$ for the gestures in FIGS. 5A-5C can be conveyed by the generalized expression:

$$M_2 = f_2(x,y,t,n) \quad \text{Eq. (6)}$$

where $\{x, y\}$ denote Cartesian coordinates, t denotes a time that a particular a location was touched, and n denotes the sequence upon which a location was touched.

By ignoring time, a more generalized, but incomplete, metric $M'_2$ for the gestures in FIGS. 5A-5C may also be conveyed by the expression:

$$M'_2 = f_2(X,y,n) \quad \text{Eq. (7)}$$

By ignoring time and sequence, the more generalized and incomplete, metric $M''_2$ for the gestures in FIGS. 5A-5C may also be conveyed by the expression:

$$M''_2 = f_2(x,y) \quad \text{Eq. (8)}$$

Figure 7:
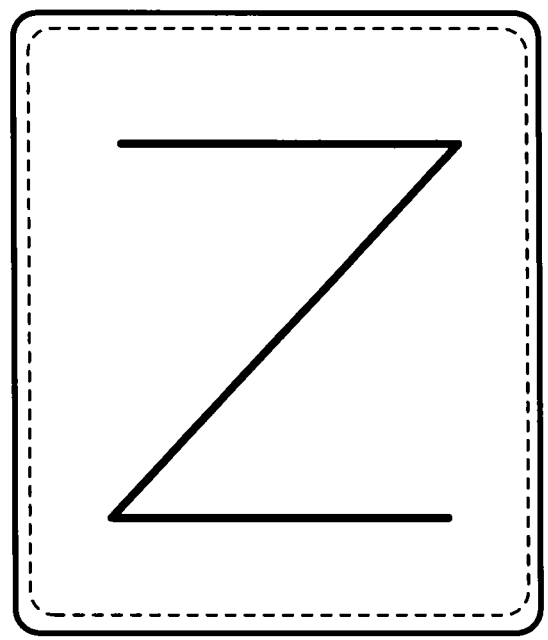
FIG. 7 depict a second reference image for the second gesture usable to establish secure communications.

FIG. 7 depicts a respective second reference image 710 for which a user strives to imitate with the gestures of FIGS. 6A-6C. As with the first reference image 510, the first reference image 710 can be stored as a metric taking into account a desired sequence according Eq. (9) below:

$$M'_{R2} = f_{R1}(x,y,n) \quad \text{Eq. (9)}$$

or be reduced to a set of x, y coordinates according Eq. (10) below:

$$M''_{R2} = f_{R1}(x,y) \quad \text{Eq. (10)}$$

Returning to FIG. 2, the authentication circuitry 260 creates a handshake string $H_K$ based on: (1) the user initiation time $T_I$, (2) a unique device identifier of the first communication device 110A (e.g., an International Mobile Station Equipment Identity or IMEI), and (3) one of the incomplete metrics (or two-way hashed version) that omits time, e.g., Eqs. (2) or (3). The handshake string $H_K$ can be created by, for example, by performing an exclusive-OR operation on the three items of data according to Eq. (11) below:

$$H_K = S_{TI}(+)S_{UDI}(+)S_{MR1} \qquad \text{Eq. (11)}$$

where: (+) denotes an exclusive-OR operation, $S_{TI}$ is a string based on initiation time $S_{UDI}$ is a string based on the unique device identifier, and $S_{MR1}$ is a string based on an incomplete metric, e.g., a metric consistent with either Eq. (2) or Eq. (3) in that they omit time information.

The authentication circuitry 260 can then send the handshake string $H_K$ to the second/remote device via the input/output circuitry 290. The authentication circuitry 260 can similarly receive a complementary handshake string from the second/remote device based upon the same type of information available in the second device, i.e., (1) the user initiation time $T_I$, (2) a unique device identifier of the second/remote device, and (3) one of the incomplete metrics that omits time information, e.g., Eqs. (7) or (8).

It is to be appreciated that each remote device for which secure communications is desired must contain the unique device identifier and reference image 510 of the first communication device 110A of FIG. 2. Similarly, the device of FIG. 2 should a priori contain the unique device identifier and reference image (e.g., reference image 710 of FIG. 7) any such remote device.

Assuming the appropriate a priori knowledge is available, the authentication circuitry 260 can then verify the identity of the second/remote device using the received/second handshake string. Authentication between devices uses one of the limited information metrics that excludes time information, but may optionally include sequence information. Metric $M'_1$ may be compared to reference image metric $M'_{R1}$, or in the alternative metric $M''_1$ may be compared to reference image metric $M''_{R1}$ depending on whether or not sequence information is desirable to be incorporated. For example, by comparing the shape of FIGS. 6A-6C (as defined by {x,y} coordinates) to the Z-shaped reference image 710 of FIG. 7, the authentication circuitry 260 can determine whether or not there is enough similarity between what is received and what is expected to be received to justify secure communication.

Once authentication has been properly established by both the first communication device 110A of FIG. 2 and the second/remote device, the initial key generation circuitry 270 generates an initial encryption key $K_I$ according to Eq. (12) below:

$$K_I = M''_{R2}(+)M''_1(+)M''_2(+)S_{TI}. \qquad \text{Eq. (12)}$$

where: (+) denotes an exclusive-OR operation, $M''_{R2}$ (or alternatively $M'_{R2}$) is the reference image of the remote device, $M''_1$ (or alternatively $M'_1$) is the metric for the gesture of the first device without time information, $M''_2$ (or alternatively $M'_2$) is the metric for the gesture of the second/remote device without time information, and $S_{TI}$ is a string based on initiation time $T_I$.

Meanwhile, the strong key generation circuitry 280 generates a strong encryption key $K_S$ according to Eq. (13) below:

$$K_S = M''_{R2}(+)S_{M1}(+)M''_2(+)S_{TI}. \qquad \text{Eq. (13)}$$

where: (+) denotes an exclusive-OR operation, $M''_{R2}$ (or alternatively $M'_{R2}$) is the reference image of the remote device, $S_{M1}$ is a string for the gesture of the first device with time information, $M''_2$ (or alternatively $M'_2$) is the metric for the gesture of the second/remote device without time information, and $S_{TI}$ is a string based on initiation time $T_I$. String $S_{M1}$ may be constructed using any number of methods, including concatenation of data, using a hash function on $M_1$, using $M_1$ as a seed for a pseudo-random number generator or convolutional encoder, and so on. Again, it is to be emphasized that the strong encryption key incorporates time information (absolute or relative) whereas the initial encryption key does not.

The encryption/decryption device 280 then encrypts the strong encryption key $K_S$ using the initial encryption key $K_I$, and the input/output circuitry 290 delivers the encrypted strong key $K_{SI}$ to the second/remote device. As the remote device is assumed to be in possession of the appropriate data, it should be able to reconstruct $S_{M1}$, then use $S_{M1}$ to decrypt data sent by the first communication device 110A.

The second/remote device can similarly provide its own strong encryption key to the first communication device 110A where after the encryption/decryption circuitry 280 can decrypt any received message from the second/remote device using the received strong encryption key.

Figure 8:
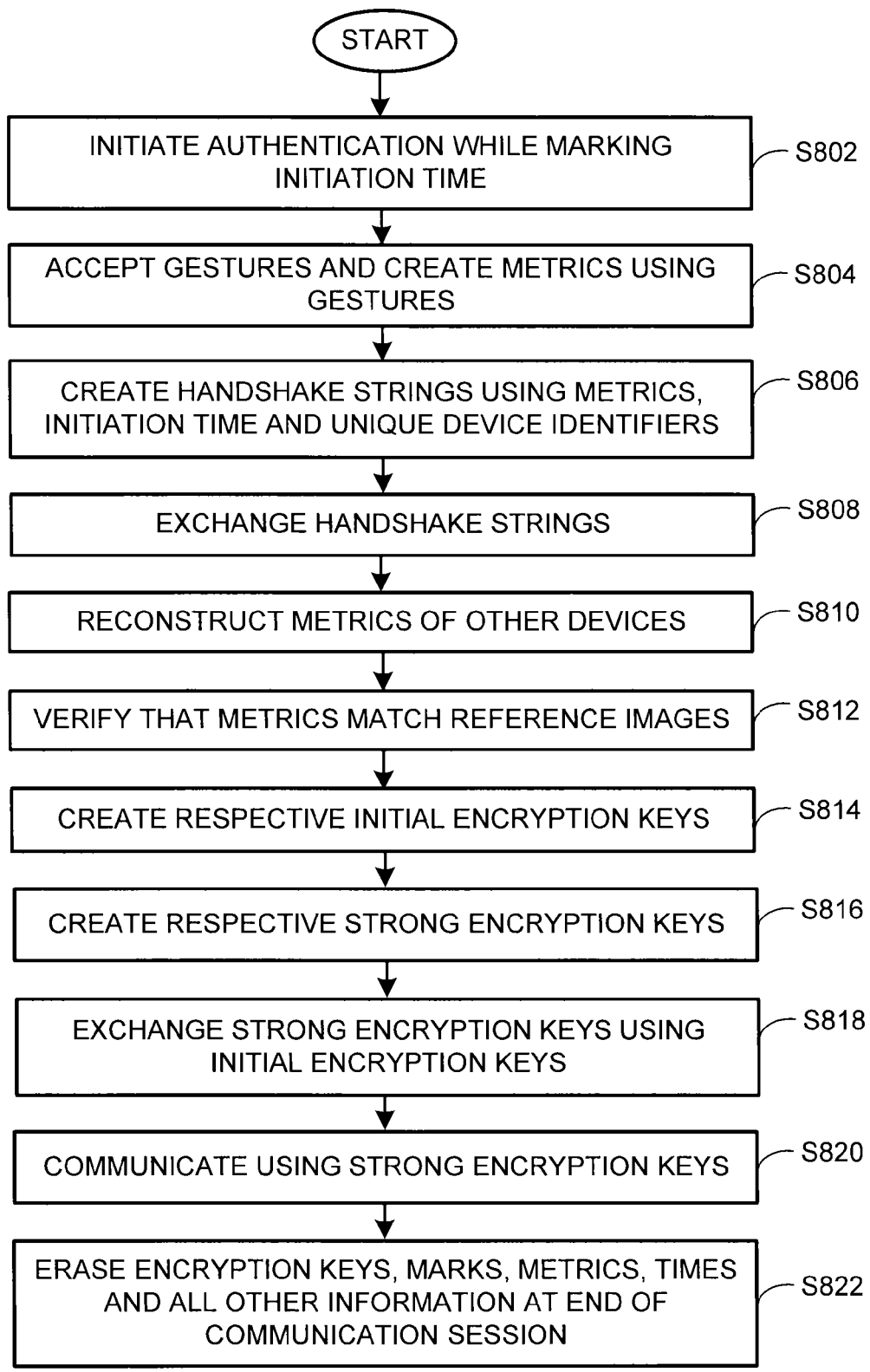
FIG. 8 is a flowchart outlining a set of exemplary operations usable for establishing a secure communications link and communicating data.

FIG. 8 is a flowchart outlining a set of exemplary operations usable for establishing a secure communications link and communicating data. While the below-described steps are described as occurring in a particular sequence for convenience, it is noted that the order of various operations may be changed from embodiment to embodiment. It is further noted that various operations may occur simultaneously or may be made to occur in an overlapping fashion.

The process starts in step S802 where a user can initiate a secure communications link in a first communication device while marking the initiation time $T_I$ of secure communications. Assuming the request for a secure communications link is accepted in a second communication device, in step S804, both the first and second communication devices accept gestures by respective users, and create respective metrics, $M_1$ and $M_2$, based on the gestures. Then, in step S806, handshake strings $H_{K1}$ and $H_{K2}$ for the respective communication devices are formed, for example, by using Eq. (11) above using the initiation time $T_I$, respective metrics (sans time information) and unique device identifiers. Control continues to step S808.

In step S808, the handshake strings are exchanged, and in step S810 the metrics of opposing communication devices are reconstructed assuming that the appropriate a priori data is available to each communication device. Next, in step S812, the reconstructed metrics are compared to respective reference images to verify that the metrics are a sufficient match to what is expected, e.g., a hand drawn image of the letter "Z" matches a template of the letter Z. Control continues to step S814.

In step S814, the respective communications devices can create initial encryption keys according to the processes and restrictions of Eq. (12) above, and in step S816 the respective communications devices can create strong encryption keys according to the processes and restrictions of Eq. (13) above noting that the strong encryption keys will incorporate time data and may be optionally processed using hash functions or some other function. Control continues to step S818.

In step S818, the strong encryption keys are exchanged by first encrypting them using the respective initial encryption keys, then sending the encrypted strong keys to opposing devices. Next, in step S920 communications between the two communication devices can proceed using the respective encryption keys, and when communications are to be terminated all sensitive data, such as encryption keys, gestures, metrics, timing information and so on, is erased.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A method for establishing secure communications, comprising:
   measuring one or more human gestures using a sensor on a first device so as to create a first metric based on the one or more human gestures that includes time-based information corresponding to the one or more human gestures;
   creating a strong encryption key based on the first metric, including the time-based information incorporated into the first metric; communicating to a second device using the strong encryption key to encrypt data sent to the second device; and
   performing an authentication between the first device and the second device including: creating a first handshake string based on a communication initiation time, a unique device identifier of the first device and the first metric;
   sending the first handshake string to the second device; receiving a second handshake string from the second device, the second handshake string created using the communication initiation time, a unique device identifier of the second device and a second gesture-based metric created at the second device; and verifying an identity of the second device using the second handshake string using pre-stored information including the unique device identifier of the second device and a reference image associated with the second device.

2. The method of claim 1, wherein the one or more human gestures are measured by a touch screen incorporated into the first device.

3. The method of claim 2, wherein the first metric includes spatial coordinates of locations touched, a sequence in which the locations were touched, and time information when the locations were touched.

4. The method of claim 1, further comprising creating an initial encryption key, and sending the strong encryption key to the second device in an encrypted form using the initial encryption key.

5. The method of claim 4, wherein creating the initial encryption key includes creating a first string using the second image reference, the first metric and the second metric.

6. The method of claim 5, wherein creating the strong encryption key includes creating a second string using time-based information of the first metric not used in the creation of the initial encryption key.

7. The method of claim 6, wherein creating the strong encryption key further includes applying a hash function to the second string.

8. The method of claim 6, wherein creating the strong encryption key further includes scrambling the second string.

9. A device for establishing secure communications, comprising:
   a sensor capable of time-based measurement of one or more human gestures;
   metric circuitry configured to create a first metric based on the one or more human gestures that includes time-based information corresponding to the one or more human gestures;
   initial key generation circuitry capable of producing an initial encryption key based on a portion of the first metric;
   strong key generation circuitry capable of producing a strong encryption key based on the first metric including time information of the first metric not used to create the initial encryption key;
   encryption circuitry configured to encode the strong encryption key using the initial encryption key to create an encoded strong encryption key; and
   input/output circuitry configured to send the encoded strong encryption key to a second device.

10. The device of claim 9, wherein the sensor includes a touch screen incorporated into the device, and wherein the first metric is derived based on plurality of locations touched by a user along with at least one of a sequence of locations touched and respective times that each location was touched.

11. The device of claim 9, further comprising authentication circuitry configured to perform authentication between the device and the second device.

12. The device of claim 11, wherein the authentication circuitry is configured to:
    create a first handshake string based on a communication initiation time, a unique device identifier of the device and the first metric;
    send the first handshake string to the second device;
    receive a second handshake string from the second device, the second handshake string created using the communication initiation time, a unique device identifier of the second device and a second gesture-based metric created at the second device; and
    verify the identity of the second device using the second handshake string using pre-stored information including the unique device identifier of the second device and a reference image of the second device.

13. The device of claim 11, wherein the strong key generation circuit generates the strong encryption key by producing a string based on the first metric, then applying a hash function to the string.

14. A method for establishing secure communications, comprising:
    time-based measuring of one or more human gestures on a first device having a sensor;
    creating a first metric using the sensor based on the one or more human gestures that includes time-based information corresponding to the one or more human gestures;
    producing an initial encryption key based on a portion of the first metric;
    producing a strong encryption key based on the first metric including the time-based information of the first metric not used to create the initial encryption key;
    encoding the strong encryption key using the initial encryption key to create an encoded strong encryption key; and
    sending the encoded strong encryption key to a second device.

15. The method of claim 14, wherein time-based measuring is performed using a touch screen incorporated into the first device, and wherein the first metric is derived based on plurality of locations touched by a user along with at least one of a sequence of locations touched and respective times that each location was touched.

16. The method of claim 15, further comprising performing an authentication between the first device and the second device.

17. The method of claim 16, wherein performing the authentication between the first device and the second device includes:
- creating a first handshake string based on a communication initiation time, a unique device identifier of the first device and the first metric;
- sending the first handshake string to the second device;
- receiving a second handshake string from the second device, the second handshake string created using the communication initiation time, a unique device identifier of the second device and a second gesture-based metric created at the second device; and verifying the identity of the second device using the second handshake string using pre-stored information including the unique device identifier of the second device and a reference image of the second device.

* * * * *